Nov. 1, 1966   N. O. ROSAEN   3,282,102
FLOW INDICATORS
Filed Feb. 7, 1966
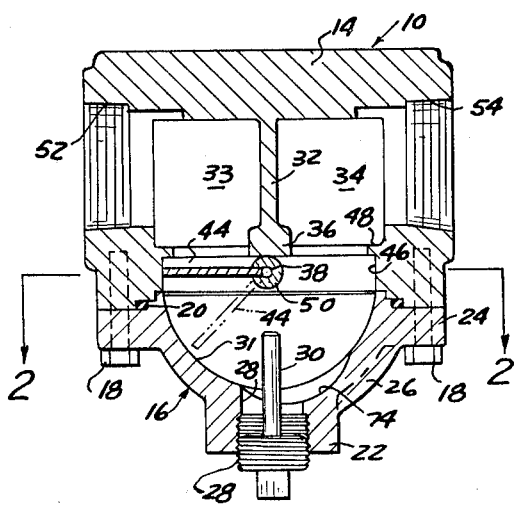
FIG. 1
FIG. 3
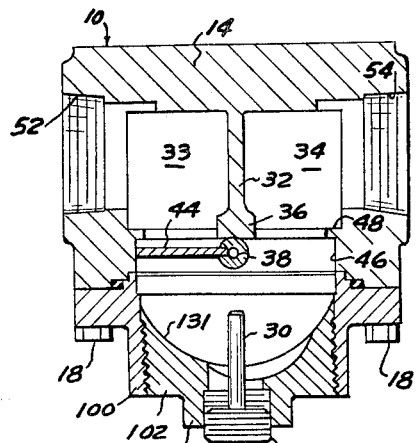
FIG. 4
FIG. 2
INVENTOR
NILS O. ROSAEN
BY  Hawke & Hawke
ATTORNEYS United States Patent Office 3,282,102
Patented Nov. 1, 1966

3,282,102
FLOW INDICATORS
Nils O. Rosaen, Bloomfield Hills, Mich., assignor to Norco Products Incorporated, Detroit, Mich., a corporation of Michigan
Filed Feb. 7, 1966, Ser. No. 525,773
10 Claims. (Cl. 73—228)

This application is a continuation-in-part of application Ser. No. 322,712, filed Nov. 12, 1963, now abandoned.

This application relates to fluid systems and more particularly to a new means for indicating the rate of fluid flow through the system.

A variety of measuring instruments are now available for supplying information as to the rate of flow in a fluid system. These instruments may be broadly divided into positive displacement meters and rate meters. In the former type of flow meter, pistons or partitions are displaced by the flowing fluid and mechanism records or indicates the displacement. In a rate meter (e.g. venturi meters, elbow meters), the pressure is measured at various points along a special section of narrow or bent pipe and the amount of flow calculated from the pressure differential.

Although these various types of measuring devices provide very accurate measurements, they are so expensive to construct and install, and so difficult to operate, that their use is necessarily limited to expensive hydraulic installations or equipment operated by skilled personnel.

Of the two types positive displacement meters are the most economical to provide. Heretofore however such flow indicators have not been too accurate. This results from the fact that small amounts of friction interfering with movement of the fluid movable member will produce wide variations in the indicated rate of flow.

An example of previously disclosed flow indicators of the positive displacement type can be found in Swiss Patent No. 161,340, published July 17, 1933. This patent discloses a flow indicator in which a rectangular vane is pivotable upon an axis adjacent a curved wall. The curved wall comprises a section of a cylinder and is on an axis spaced from the axis of the rotation of the vane so that as the vane is pivoted by the fluid, a passage is produced between the edge of the vane and the curved wall which gradually increases in area as the angle of rotation of the vane increases. An indicating needle is connected to the vane so that the position of the vane and thus the rate of fluid flow through the device will be indicated.

The problem with the device of the Swiss patent is that because it uses a cylindrical wall section and a rectangular vane there is friction between the sides of the vane and the side walls forming the passage throughout movement of the vane and this friction will interfere with an accurate indication of fluid flow through the device. Further, the open area of the passage increases only slightly near the closed position and greatly near the open position so that calibration of the indicator would be difficult.

The present invention provides a flow indicator having a curved wall section which is in the form of a section of a sphere. A semi-circular vane is provided and is pivotable upon an axis spaced from the center of the sphere. This provides a device in which when the vane is in the closed position, it completely closes fluid passages through the device but in which slight flow moves the vane to a position in which a passage is opened between the wall and the complete extent of the curved edge of the vane. Thus even with slight flow the edge of the vane is free from the wall and the problem of friction in these areas is avoided. Further, by utilizing a substantially semi-spherical wall section and a semi-circular vane, it has been found that there is substantially a direct correspondence between the movement of the vane and the rate of fluid flow through the device throughout the full range of movement thereof so that calibration of the indicator can be accomplished by providing substantially equally spaced gradations.

Further, previous devices of this nature have not provided a practical means of making the device adaptable for fluid systems of different flow capacities. Thus each device had to be manufactured and calibrated for use in fluid systems within a rather limited range of flow rates. The present invention includes means for permitting the device to be used in different systems having different ranges of fluid flow rates capabilities. This is accomplished in one embodiment of the present invention by replacing a bowl portion which defines the semi-spherical wall with a similar bowl portion having a wall portion of the same diameter but with the center thereof spaced a different distance from the axis of rotation of the vane. Thus, with the semi-spherical wall surface formed with a center closer to the axis of rotation of the vane, a smaller area is opened between the vane and the wall at each position of the vane. By replacing the indicator plate with one appropriate for the particular bowl portion being used the device would then provide an accurate indication of the flow rate in a system where the flow capacity was not as great as the previous system. Similarly, the bowl can be replaced by one having the center of the wall section farther from the axis of rotation of the vane or this can be accomplished by shims or gaskets and the device will then be ready for use in high capacity systems.

In another embodiment of the invention, this can be accomplished by means of an adjustment provided for moving the bowl toward and away from the axis of rotation of the vane.

It is an object of the present invention to provide an improved flow indicator for fluid systems by providing a device having a semi-circular vane member movable along a wall section of a substantially semi-spherical profile with the center of the wall and the axis of rotation of the vane spaced so as to provide an increasing area between the vane and the wall as the angle of rotation of the vane increases.

It is another object of the present invention to substantially reduce the effects of friction on positive displacement type flow indicators by providing such a device in which an area is opened on all sides of the vane member immediately upon the vane moving from the closed position.

It is another object of the present invention to provide flow indicating devices capable of use in fluid systems of different fluid flow capacities by providing such a device with means permitting the area between the movable vane and the associated wall section to be varied in accordance with the range of fluid flow rates for the particular fluid system in which the device is to be used.

Still further objects and advantages of the present invention will readily occurs to one skilled in the art to which the invention pertains upon reference to the following description. The description makes reference to the accompanying drawings in which like reference characters refer to like parts throughout the several views and in which FIG. 1 is a cross-sectional view through one preferred embodiment of the present invention.

FIG. 2 is a cross sectional view taken along the lines 2—2 of FIG. 1.

FIG. 3 is an elevational view taken along line 3—3 of FIG. 2, and

FIG. 4 is a view similar to FIG. 1 but illustrating another preferred embodiment of the present invention.

Now referring to the drawings for a more detailed description of the present invention, one preferred embodiment thereof is illustrated in FIGS. 1–3 as comprising a housing 10 generally cylindrical in form and having opposing flattened side portions 12, and a wall 14 at the upper end of the housing. An end bell or bowl 16 is fixed in fluid-tight position across the lower open end of the housing by means of screws 18 and a resilient O-ring seal 20.

The bowl 16 includes a cylindrical stem 22, an annular flange 24 abutting the housing through which the screws 18 extend, and an annular curved portion 26 joining the stem 22 and flange 24. The stem 22 is bored axially at 28 so as to provide communication with the interior of the bowl 16 and the housing 10. A plug 29 is insertable in fluid-tight manner in the bore 28 and carries a pin 30 which extends upwardly into the interior of the bowl 16. The interior substantially semi-spherical surface 31 of the bowl 16 is curved in a manner which will be later described in detail.

A vertical partition 32 projects perpendicularly from the wall 14 toward the bowl 16 between opposing inner wall surfaces of the housing 10 extending along a line joining the two side portions 12. The partition 32 divides the interior of the housing 10 into two spaces 33 and 34 of equal volume. The portion 32 is wider at its end face 36 and is flattened along its length.

A shaft 38 is rotatably mounted at each end in the housing 10 and extends closely adjacent and parallel to the end face 36. Bushings 40 are mounted in the housing 10 by screws 42 for receiving the ends of the shaft 38. A flap or vane member 44 of generally semi-circular configuration is carried at its straight edge by a sleeve 45 which is fixed to the shaft 38 so that the vane member 44 and the shaft 38 rotate together.

The housing 10 is provided with a substantially cylindrical recess 46 registering with the substantially semi-spherical surface 31 of the bowl 16. An annular radially inwardly extending flange portion 48 is formed in the housing 10 intermediate the chambers 33–34 and the recess 46. The recess 46 is formed in a radius substantially equal to the radius of the vane member 44 and on an axis substantially normal to and which bisects the axis of rotation of the vane member 44. Thus when the vane member 44 is disposed in the plane perpendicular to the partition 32 as shown in FIG. 1, it extends across the semi-circular space formed by the recess 46 and the partition 32 to seal off the space 33 from the interior of the bowl 16 and the space 34. The annular flange portion 48 serves as a stop and prevents the vane member 44 from rotating farther into the space 33.

The radius of the vane member 44 and the substantially semi-spherical surface 31 formed in the bowl 16 are substantially equal. Thus, if the center of the surface 16 and the center of the semi-sphere circumscribed by the rotating vane member 44 were coincident then the surface 31 and the semi-sphere circumscribed by the free edge of the rotating flap member 44 would continuously separate the spaces within the housing 10 and the bowl 16 into two substantially fluid tight compartments, between which fluid could not flow. To provide an opening between these two compartments which will vary in size depending upon the position of the vane member 44, the center of the semi-spherical surface 31 is displaced outwardly from the center of the semi-sphere circumscribed by the rotating vane member 44. Both centers are located along the central axis of the cylindrical housing 10 but the center of the surface 31 shown at 50 in FIG. 1 is situated closer to the bowl 16.

As a result, the vane member 44 substantially completely seals the space 33 when it is rotated to the position shown in FIG. 1. However, when it is rotated counter-clockwise toward the position shown in phantom lines, the outer edge of the vane member 44 no longer abuts the inner surface 31 of the bowl 16 and a curved opening through which fluid may pass is thereby created about the semi-circular edge of the vane member 44. The size of this opening increases proportionately as the vane member 44 moves counter-clockwise from its closed position toward the position shown in phantom lines.

The side of the housing 10 adjacent the space 33 is provided with a radially disposed inlet bore 52 adapted to receive the end of a conduit (not shown) through which the fluid is directed. The opposite side of the housing 10, adjacent the space 34 is similarly provided with a radially disposed outlet bore 54 so adapted to be connected to a conduit (not shown) leading to a fluid user (not shown).

As can best be seen in FIG. 2, each end of the shaft 38 extends through the bushings 40 which are mounted by the screws 42 in suitable recesses 56 and aligning bores 58 provided in the housing 10. One of the side portions 12 is provided with an annular recess 60 registering with the adjacent recess 56 into which the end of the shaft 38 extends. A cap 62 closes the recess 60. A low tension coil spring 64 has one end fixed to the cap 62 by a pin 66 and the opposite end fixed to the shaft 38 so that the spring 64 provides a very slight rotational force to the shaft 38 and thus the vane member 44 to urge the vane member 44 toward the closed position. It is to be understood that the spring 64 is not intended to provide any measurable resisting force against fluid moving past the vane member 44. Thus the vane member 44 does not act as a valve in the sense of regulating the amount of flow but is merely responsive to the force produced by fluid flowing through the device to assume a rotated position which depends upon the rate of such flow. The free end of the shaft 38 is preferably journalled in the cap 62.

The opposite side portion 12 of the housing 10 is provided with an annular recess 67 which registers with the adjacent recess 56. The end of the shaft 38 extends axially through the recess 67 and carries a pointer member 68. The pointer member 68 rotates with the shaft 38 and points to suitable indicia on a graduated scale 70 carried on a raised portion 72 on the surface of the housing 10, as can best be seen in FIG. 3.

As described above, since the vane member 44 and the spring 64 offers only very slight resistance to the passing fluid, the vane member 44 will be moved to the closed position only when flow through the device is non-existant. When flow is provided through the device, it will act upon the vane member 44 to rotate it in a counter-clockwise direction. As the vane member 44 is so rotated, a passage is created between the curved edge of the vane member 44 and the surface 31 which increases in size as the angle of rotation of the vane member 44 increases. Thus at each rate of fluid flow through the device, the vane member 44 will be moved to a rotational position opening a passage between the vane member 44 and the surface 31 of a sufficient area to accommodate the particular flow rate through the device. The particular configuration of the vane member 44 and the surface 31 permits a substantially equally divided graduated scale 70 to be provided and marked so that the pointer element 68 will accurately indicate the rate of fluid flow through the device at any particular time.

The pressure in the fluid may not always be constant or vary uniformly. Pressure surges in the system will cause a sudden movement of the vane member 44 and may induce disturbing back pressures in the flow indicator. To reduce this likelihood the inner surface of the bowl 16 is provided with a concavity 74 adjacent the pin 30. The concavity 74 is of a shorter radius than the remainder of the surface 31 and is formed about a center eccentric to the center of the surface 31 so that it penetrates the surface 31 beginning at a point adjacent the fully open position of the vane member 44.

A sudden pressure surge in the fluid will cause vane member 44 to rotate to a position against the pin 30. The pin 30 prevents the vane member 44 from rotating past the fully open position and diminishing the passage when the flow rate through the device requires that the passage be of a maximum area. As the vane member 44 moves against the pin 30, the area past the vane member 44 is substantially increased by reason of the concavity 74. This relieves the sudden pressure build-up which might be caused by pressure surges and reduces the possibility of substantial back pressures.

As the invention has thus far been described, it is apparent that the cross-sectional area between the vane member 44 and the surface 31 at the fully open position limits the maximum flow rate which can be produced through the device. Thus, if the device is dimensioned to produce an area at the fully open position which will accommodate a flow rate of 20 g.p.m. for instance, the device would not be useful in a system capable of delivering fluid at a flow rate higher than 20 g.p.m. One important advantage of the device of the present invention is that it can be readily changed to accommodate fluid systems having different ranges of fluid flow capabilities.

It is apparent that the area which will be opened between the end of the vane member 44 and the surface 31 will remain proportional to the degree of movement of the vane member but can be increased or decreased by moving the relative positions of the centers of the surface 31 and the semi-sphere circumscribed by the free edge of the vane member 44. Thus with the centers closer together, the area at each position of the vane member 44 will be smaller and with the centers farther apart the area will be larger. This permits the device to be readily changed to accommodate a greater or smaller fluid flow capacity by either replacing the bowl 16 having the surface 31 formed with a different center or by providing gaskets or spacers between the housing 10 and the bowl 16 to relocate the center of the surface 31. The indicator plate carrying the graduated scale 70 would then be replaced by one having the appropriate indicia for the system in which the device is to be used.

Another preferred embodiment of the present invention is illustrated in FIG. 4. The embodiment of FIG. 4 is substantially similar to the device described above but illustrates means for more conveniently utilizing the adjustable feature of the device. In place of the particular bowl 16 illustrated above, the device of FIG. 4 is provided with a cylindrical internally threaded portion 100 of the housing 10 which receives the threaded external surface of a bowl 102. The bowl 102 is provided with an inner substantially semi-spherical surface 131 substantially like the surface 31 described above which cooperates with the vane member 44 as described above.

The stem portion 104 of the bowl 102 is suitably formed to accommodate a tool such as a wrench for rotating the bowl 102 within the cylindrical portion 100 of the housing 10. It is apparent that rotation of the bowl 102 in the cylindrical portion 100 will change the relative locations of the center of the semi-spherical surface 131 and the semi-sphere circumscribed by the vane member 44. This provides a convenient means for varying the range of rates of fluid flow which the device can accommodate.

It is apparent that fluid flow indicators have been described which can be economically constructed and yet in which highly reliable results have been achieved. The reliability is the result of the particular configurations of the vane member and the cooperating surface. This is not only because of the particular area which is opened at each position of the vane member but also because upon movement the moving edge of the vane member is immediately out of contact with the surface. Friction is in this way kept at a minimum so that it cannot destroy the accuracy of the device. This is in contrast with those constructions in which a rectangular vane is used and the side edges of the vane are in contact with surfaces of the housing throughout movement of the vane.

It is also apparent that I although have described but several embodiments of my invention, many other changes and modifications can be made therein without departing from the spirit of the invention as expressed by the appended claims.

I claim:
1. A flow indicator for a fluid system comprising,
   (a) a housing having an inlet and an outlet adapted to be connected with said system,
   (b) a vane member and means rotatably mounting said vane member in said housing intermediate said inlet and said outlet,
   (c) said housing being provided with an interior wall having a substantially semi-spherical inner surface and said vane member having a substantially semi-circular edge rotatable adjacent said semi-spherical surface,
   (d) the center of said semi-spherical surface being displaced from the center of the semi-sphere circumscribed by said circular edge upon rotation of said vane member whereby the space between said edge and said surface varies at each rotated position of said vane member, and
   (e) means indicating the position of said vane member exteriorly of said housing.
2. The device as defined in claim 1 and including
   (a) a shaft rotatably mounted in said housing, and
   (b) said vane member being mounted to said shaft to rotate with said shaft.
3. The device as defined in claim 2 and in which said last mentioned means comprises
   (a) a graduated scale on the exterior of said housing, and
   (b) a pointer member fixed to said shaft for rotation therewith and extending towards said scale to indicate the position of said vane member.
4. The device as defined in claim 2 and including spring means fixed to one end of said shaft to urge said vane member toward a position closing fluid flow through said device.
5. The device as defined in claim 1 and including means for varying the displacement between the center of said semi-spherical surface and the center of the semi-sphere circumscribed by said semi-circular edge upon rotation of said vane member.
6. The device as defined in claim 1 and in which the radius of said semi-circular edge is substantially equal to the radius of said semi-spherical surface.
7. The device as defined in claim 5 and in which said last mentioned means comprises
   (a) a bowl member defining said semi-spherical surface,
   (b) means mounting said bowl member to said housing including means for varying the position of said surface with respect to the circular edge of said vane member.
8. The device as defined in claim 7 and including a pin carried by said bowl and extending inwardly past said semi-spherical surface to limit rotational movement of said vane member.
9. The device as defined in claim 8 and in which said bowl is provided with a concavity extending into said inner surface in an area adjacent said pin.
10. The device as defined in claim 1 and in which
   (a) said housing is provided with an inner partition separating said inlet and said outlet, and
   (b) said vane member being rotatable on an axis parallel to and closely adjacent one end of said partition.

No references cited.

RICHARD C. QUEISSER, *Primary Examiner.*